July 7, 1970  A. M. GIBSON, JR  3,519,778
METHOD AND APPARATUS FOR JOINING ELECTRICAL CONDUCTORS
Filed Jan. 19, 1968  2 Sheets-Sheet 1

INVENTOR.
ARCHIBALD M. GIBSON JR.
BY Michael Masnik
HIS ATTORNEY

July 7, 1970　　　　　A. M. GIBSON, JR　　　　　3,519,778
METHOD AND APPARATUS FOR JOINING ELECTRICAL CONDUCTORS
Filed Jan. 19, 1968　　　　　　　　　　　　　　2 Sheets-Sheet 2
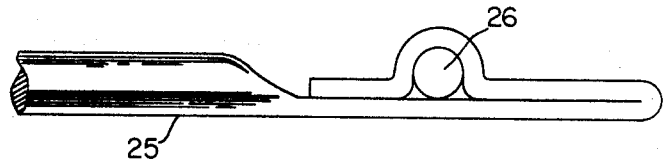
FIG. 2
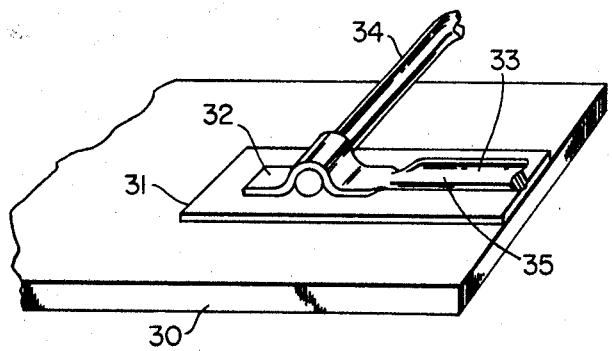
FIG. 3
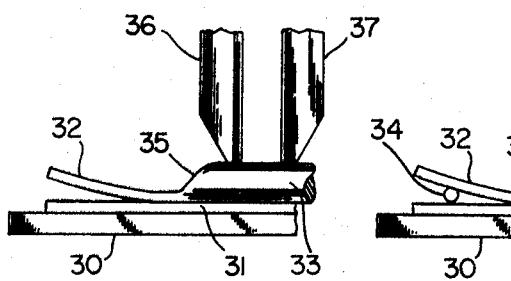　　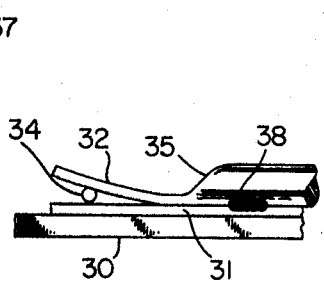　　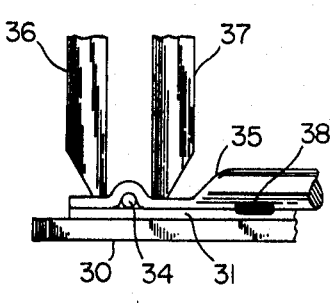
FIG. 4A　　　　FIG. 4B　　　　FIG. 4C
INVENTOR.
ARCHIBALD M. GIBSON JR.
BY *Michael Masnik*
HIS ATTORNEY

United States Patent Office 3,519,778
Patented July 7, 1970

---

3,519,778
METHOD AND APPARATUS FOR JOINING ELECTRICAL CONDUCTORS
Archibald M. Gibson, Jr., Waynesboro, Va., assignor to General Electric Company, a corporation of New York
Filed Jan. 19, 1968, Ser. No. 699,184
Int. Cl. B23k *11/00*
U.S. Cl. 219—58                               8 Claims

ABSTRACT OF THE DISCLOSURE

A method and apparatus for joining small diameter insulated wires to heavier conductors, without requiring insulation stripping, wherein spaced electrodes are utilized to initially cold form the heavier conductor about the small wire and thereafter an electric current is applied.

BACKGROUND OF THE INVENTION

This invention relates to a method and apparatus for joining conductors, and more particularly to a method and apparatus for joining small insulated conductors to relatively larger conductors.

Almost every piece of electrical equipment includes joints or couplings between the various circuit elements. It is essential that these joints be mechanically secure and electrically reliable. When large numbers of joints are to be made, it is obvious that the speed and accuracy of the joining technique plays an important role in establishing the cost of the final units.

One problem that frequently arises during the assembly of electrical components is that of joining dissimilar materials. The dissimilarity may be due to both structure and composition. In fact, sometimes one of the elements involved may be of such delicate structure that it cannot be safely joined with many of the existing techniques.

Electrical circuit wiring also introduces the problem of providing appropriate insulation of the various conductors from one another and from adjacent surfaces. When insulated conductors are used to resolve this problem, the joining thereof is often complicated by the need for stripping the insulation from the conductors prior to forming a joint.

The present invention is concerned primarily with welding and brazing techniques for joining materials that are electrical conductors, and which may be insulated. One known welding system employs hot electrodes which are forced against the insulated conductors in order to soften the insulation and displace it from particular areas so that metal to metal contact will permit passage of electrical current for welding of the parts. Since force is applied directly to the conductors in this method, it cannot be used with small diameter wires because of the danger of breaking or cutting these wires. Furthermore, the electrodes tend to pick up sticky particles of decomposed insulation and this changes the electrode contacting surface causing a variation in the heating effect. Still further, when welding one strand of a small wire to another part, the hot deforming is severe and weakens the metal strength adjacent to the weld. This also seriously limits the range of conditions in which the equipment must be controlled.

Another known welding technique utilizes ultrasonic energy. In one form, the materials to be joined are encased in a sleeve with a thermal plastic composition which tends to encapsulate an ultrasonically bounded joint in the displaced plastic composition. This is a relatively complicated and time-consuming process and cannot be used with wires as small as those contemplated by this invention.

Recently, laser welding has been demonstrated wherein a minute area of melt is produced to permit the fusion of metal with an affinity to alloy such as copper and nickel. With this type of welding, positioning must be extremely precise in order to insure repeatability of quality and the equipment, replacement parts, and process, lead to substantial cost.

SUMMARY OF THE INVENTION

In accordance with the present invention there is provided a joining technique for electrical conductors wherein one of the conductors is insulated, comprising overlying the insulated conductor with first and second ribbons of a second conductor or conductors, so that the insulated conductor is sandwiched between these ribbon conductors. One of the ribbon conductors is then cold formed around the insulated conductor by applying pressure with two spaced electrodes; the spaced electrodes being positioned on opposite sides of the insulated conductor. The ribbon conductor is deformed until it is in substantial contact with the other conductor ribbon and the insulated conductor is enclosed thereby. After this initial operation, current is supplied through the electrodes causing heating in the area of the insulated conductor with consequent sublimation or decomposition of the insulation. Following the decomposition, the conductors fuse together. The amount of heating is controlled by the time of current application and/or the magnitude of the current applied.

It is also contemplated to provide brazed joints wherein one or more of the conductors has an alloy layer at the joint interface.

An object of the present invention is to provide an improved method and apparatus for joining electrical conductors wherein reliable joints can be rapidly effected.

Another object of the present invention is to provide an improved method and apparatus for joining electrical conductors wherein one of the conductors is of a relatively fragile structure in comparison with the other.

Another object of the present invention is to provide an improved method and apparatus for joining insulated electrical conductors without the need for a separate step of prestripping of this insulation.

Another object of the present invention is to provide an improved method and apparatus for joining electrical conductors wherein one of the conductors is initially cold formed to conform to the mating surface of the other conductor prior to application of fusing current.

The invention features a welding and/or brazing technique which permits the joining of not only two conductors; but also includes the possibility of joining a plurality of conductors. Furthermore, the invention features a technique which is both economical and easy to perform and provides high quality joints with considerable flexibility and minimum skill. The specific novel features of the invention are set forth with particularity in the appended claims. The invention itself, however, both as to organization and method of operation, may best be understood by reference to the following description taken in conjunction with the accompanying drawings of several illustrative embodiments thereof.

BRIEF DESCRIPTION OF THE DRAWINGS

FIG. 2 illustrates a finish joint in accordance with another illustrative embodiment of the invention;

FIG. 3 illustrates a finished joint in accordance with a third illustrative embodiment of the invention; and FIGS. 4A, 4B and 4C illustrate in elevation views, three steps in the forming of the joint shown in FIG. 3.

DESCRIPTION OF THE PREFERRED EMBODIMENT

Figure 1A:
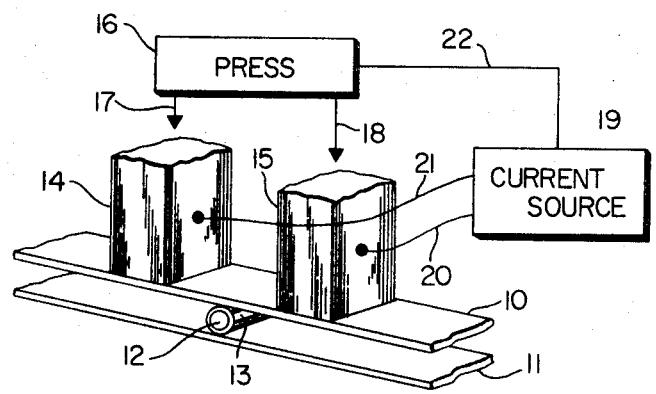
FIGS. 1A, 1B, 1C, and 1D illustrate the steps of the method and apparatus of the present invention for forming joints according to one illustrative embodiment.
Figure 1B:
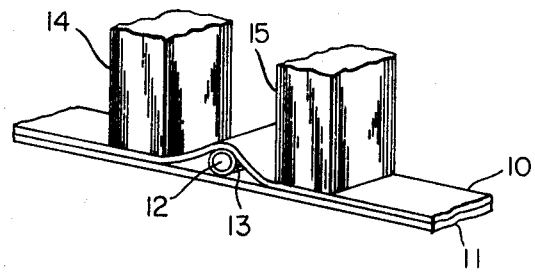
Figure 1C:
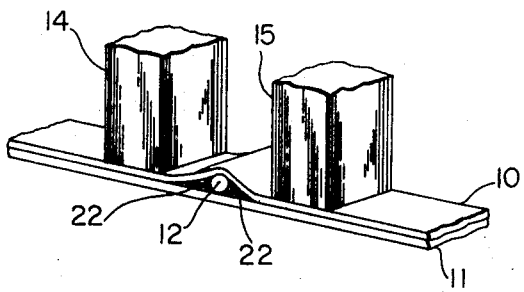
Figure 1D:
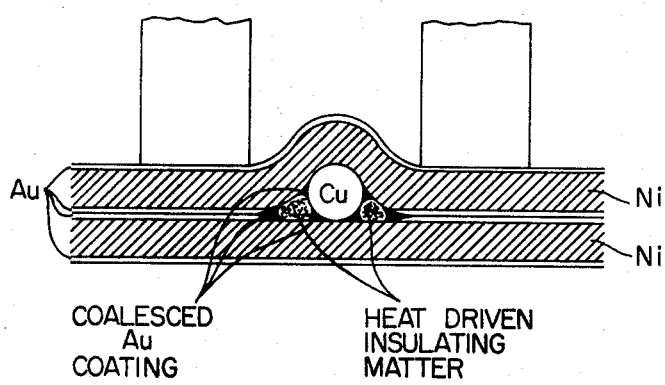

With reference to FIGS. 1A, 1B and 1C, it will be seen that three conductors 10, 11 and 12 are illustrated. Conductors 10 and 11 are considerably heavier than conductor 12 and have a flat or ribbon-like configuration. Conductor 12 has been illustrated as a thin single wire or stranded conductor having an insulation coating 13. In general, the insulation may be of a high dielectric type that is relatively thin and may include any of the well-known insulating varnishes. As shown, conductor 12 is disposed in a substantialy perpendicular relationship relative to the longitudinal axes of the ribbon conductors 10 and 11. Two electrodes 14 and 15 are disposed above the joint to be made and in a position straddling conductor 12. A press of known design is associated with the electrodes and is adapted to provide downward pressure, as for example by spring loading of the electrodes, on the upper ribbon conductor 10. Lower ribbon conductor 11 is supported on a firm base (not shown) in order to effectively provide a bearing surface against which the press 16 may act. Pressure is applied, as indicated by arrows 17 and 18, on each of the electrodes. The pressure is continued until upper ribbon conductor 10 is cold formed around conductor 12 and the composite conductor structure is as illustrated in FIG. 1B. Under the condition illustrated in FIG. 1B, it will be seen that the upper ribbon conductor 10 substantially surrounds conductor 12 and is in good contact therewith. When this condition is achieved, current source 19 is activated while maintaining electrode force on the workpieces and electric current passes between the electrodes 14, 15 through ribbon conductors 10 and 11. The heating in the area of conductor 12 sublimes or decomposes the insulation allowing the conductive material of which the conductor is made to fuse with the ribbon conductors 10 and 11 mainly at its upper and lower regions. This condition is illustrated in FIG. 1C wherein the decomposed insulation is driven away from the area of fusion and into a region such as is depicted by numeral 22.

Those skilled in the art will appreciate the fact that suitable alloys such as silver solder, or plating materials such as gold, may be coated on one or more of the conductors at their confronting faces, so that the point may be brazed. The coating material being metallic and of lower melting temperature will flow into the area of product interfaces or faying surfaces by capillary attraction. Under these conditions, the decomposed insulation is again driven off as shown at 22. A simulation of a photomicrograph representing the final result is shown at 1D.

It should be understood that the press 16 can be of any conventional type and furthermore that the current source 19 may be either a direct current source, an alternating current source, or a pulsed current source. With regard to the type and duration of current application, the teachings of the welding and brazing art are applicable. It is further contemplated that a switching arrangement operates in conjunction with the press and current source 19 so that upon attainment of a particular impedance to the press force, indicative of completion of the cold forming step, a switch will automatically turn on the current so that the joint will be automatically completed.

Although the method illustrated with respect to FIGS. 1A, 1B and 1C shows three separate conductors, it will be immediately apparent that the invention is applicable to the joining of two conductors only. FIG. 2 illustrates a joint of the nature contemplated. In this figure, a conductor 25 has had one end thereof flattened into ribbon-like form and this end was bent over to initially form a U. Conductor 26 was inserted between the legs of the U and the joining process previously described was then carried out.

A third application of the present invention is illustrated by the finished joint shown in FIG. 3. This application relates to printed circuit boards and similar structures. A printed circuit board 30 is shown having the printed conductor 31 secured thereon. Conductor 31 may be secured in any conventional manner. A relatively heavy wire conductor 35, with flattened end 32, is disposed upon this printed circuit conductor and a smaller conductor 34 is secured thereto in a substantially perpendicular direction.

The specific process steps by which the joint illustrated in FIG. 3 is achieved, may best be understood by consideration of FIGS. 4A, 4B, and 4C. These figures are diagrammatical elevation views of the joint shown in FIG. 3. FIG. 4A shows the first step in the joining process wherein conductor 35 with flattened end 32 is positioned above the conductor strip 31 and electrodes 36, 37 are applied thereto. Electrodes 36, 37 may be positioned over the non-flattened portion 33 of conductor 35, if this is desired. Current is passed through these electrodes and a welded point 38 (shown in FIG. 4B) is formed. After conductor 35 is welded to conductor strip 31, conductor 34 is inserted under the flattened end 32 and electrodes 36, 37 are positioned to straddle conductor 34. As described hereinabove in connection with FIGS. 1A, 1B, and 1C, electrodes 36, 37 have a downward force applied thereto in order to cold form the ribbon-like end of conductor 35 about conductor 34. When the cold forming is completed, electrical current is supplied completing the welding or brazing process, as illustrated in FIG. 4C.

The invention described hereinabove has been found to provide a versatile and economical technique for the welding or brazing of thin wire conductors to heavier wire conductors. The equipment and apparatus employed are relatively simple and inexpensive and the quality of the resulting joints is found to be exceptionally good. Modifications in the teachings of this invention will be apparent to those skilled in the art. It is intended to embrace all such modifications which fall within the scope of the appended claims.

What is claimed as new and desired to be secured by Letters Patent of the United States is:

1. A method of joining a first electrical conductor to two other conductors comprising positioning said first conductor between said two other conductors along a first axis, cold forming at least one of said two other conductors to substantially conform to the adjacent surface of said first conductor, and passing electric current through said two other conductors between electrodes positioned along a second axis from one side of said first conductor to the other side of said first conductor in order to fuse all of said conductors in the region of contact.

2. A method according to claim 1, wherein said two other conductors are of ribbon-like form and they are positioned to sandwich said first conductor therebetween, and one of said two other conductors is pressed towards the other on opposite sides of said first conductor during said cold forming.

3. A method according to claim 1, wherein said first and second axes are substantially orthogonal to each other and said first conductor is elongated along a third axis substantially orthogonal to said first and second axes.

4. A method of connecting first and second uninsulated electrical conductor ribbons to an electrical conductor wire covered with insulating material comprising, overlying said first and second ribbons relative to each other, sandwiching said wire between said ribbons in the region of overlay and substantially at an angle of 90° with said ribbons, applying spaced electrodes to the side of one of said ribbons facing away from said wire and with said spaced electrodes straddling said wire, providing relative pressure between said electrodes and the ribbon and wire assembly to cold deform at least said one of said ribbons about said wire, and energizing said electrodes to heat said insulated wire by passing an electrical current therethrough sufficient to remove the insulation and provide an electrically conductive diffusion of the wire into the ribbon portions between the electrodes.

5. A method of connecting first and second portions of an uninsulated electrical conductor arrangement to a third electrical conductor covered with insulating material comprising, overlying said portions relative to each other, sandwiching the third conductor between said portions in the region of overlay and at an angle with said third conductor, applying spaced electrodes to the side of one of said portions facing away from said third conductor and with said spaced electrodes straddling said wire, providing relative pressure between said electrodes and at least said one portion to cold deform said one portion about said third conductor, and electrically energizing said electrodes to heat said third conductor by passing an electrical current therethrough sufficient to remove the insulation and provide an electrically conductive diffusion of the wire into the portions between the electrodes.

6. A method of joining a first electrical conductor to two other conductors comprising positioning said first conductor between said two other conductors along a first axis, cold forming at least one of said two other conductors to substantially conform to the adjacent surface of said first conductor, and passing electric current through said two other conductors between electrodes positioned along a second axis from one side of said first conductor to the other side of said first conductor in order to fuse all of said conductors in the region of contact, wherein said two other conductors are an integral part of a single conductor which is first formed by flattening one end and thereafter bending said end 180° to produce a U between the legs of which said first conductor is positioned.

7. A method of joining a first electrical conductor to two other conductors comprising positioning said first conductor between said two other conductors along a first axis, cold forming at least one of said two other conductors to substantially conform to the adjacent surface of said first conductor, and passing electric current through said two other conductors between electrodes positioned along a second axis from one side of said first conductor to the other side of said first conductor in order to fuse all of said conductors in the region of contact, wherein said two other conductors are first fused together at a point displaced from the positioning of said first conductor.

8. A method of joining a first electrical conductor to two other conductors comprising positioning said first conductor between said two other conductors along a first axis, cold forming at least one of said two other conductors to substantially conform to the adjacent surface of said first conductor, and passing electric current through said two other conductors between electrodes positioned along a second axis from one side of said first conductor to the other side of said first conductor in order to fuse all of said conductors in the region of contact, wherein at least one of said two other conductors has an alloy on the surface thereof, said first conductor is covered with insulation, and the electric current is applied with sufficient magnitude to heat the joint and effect decomposition of said insulation and brazing of said joint.

References Cited

UNITED STATES PATENTS

| | | | |
|---|---|---|---|
| 2,250,156 | 7/1941 | Ferguson | 219—85 |
| 3,155,809 | 11/1964 | Griswold | 219—86 |
| 3,197,608 | 7/1965 | Ingraham | 219—85 |
| 3,353,263 | 11/1967 | Helms | 219—85 X |
| 3,390,248 | 6/1968 | Illingworth | 219—86 |

JOSEPH V. TRUHE, Primary Examiner

L. A. SCHUTZMAN, Assistant Examiner

U.S. Cl. X.R.

219—86, 56; 174—84